United States Patent [19]

Montagna et al.

[11] Patent Number: 4,736,414

[45] Date of Patent: Apr. 5, 1988

[54] METHOD OF AND DEVICE FOR THE DIGITAL CANCELLATION OF THE ECHO GENERATED IN CONNECTIONS WITH TIME-VARYING CHARACTERISTICS

[75] Inventors: Roberto Montagna; Luciano Nebbia, both of Turin, Italy

[73] Assignees: Cselt Centro Studi E Laboratori Telecomunicazioni Spa, Turin; Telespazio Spa per le Communicazoni Spaziali, Rome, both of Italy

[21] Appl. No.: 659,762

[22] Filed: Oct. 11, 1984

[30] Foreign Application Priority Data

Oct. 12, 1983 [IT] Italy .................. 68047 A/83

[51] Int. Cl.[4] .......................... H04B 3/23
[52] U.S. Cl. ...................... 379/411; 370/32.1; 364/724
[58] Field of Search ............ 179/170.2, 170.6, 170.8; 370/32, 32.1; 364/728, 724; 379/406, 407, 410, 411

[56] References Cited

U.S. PATENT DOCUMENTS

| | | | |
|---|---|---|---|
| 3,535,473 | 10/1970 | Flanagan et al. | 179/170.2 |
| 3,721,777 | 3/1973 | Thomas | 179/170.2 |
| 3,860,768 | 1/1975 | Wehrmann | 179/170.2 |
| 4,024,357 | 5/1977 | Sourgens et al. | 179/170.2 |
| 4,282,411 | 8/1981 | Stewart | 179/170.2 |
| 4,360,712 | 11/1982 | Horna | 179/170.2 |
| 4,546,216 | 10/1985 | Tegethoff | 179/170.2 |
| 4,558,187 | 12/1985 | Billi et al. | 179/170.2 |
| 4,562,312 | 12/1985 | Duttweiler | 179/170.2 |
| 4,577,309 | 3/1986 | Barazeche et al. | 370/32 |
| 4,582,963 | 4/1986 | Danstrom | 179/170.2 |
| 4,587,382 | 5/1986 | Yang | 179/170.2 |

OTHER PUBLICATIONS

AMI Preliminary Disclosure, AMI SZ816, Echo Canceller Processor, Jul. 1981, "Simultaneous Two-Way Data Transmission Over a Two-Wire Circuit", V. G. Koll et al., IEEE Transactions on Communications, Feb. 1973, Concise Papers, pp. 143–147.

"Echo Cancellation on Time-Variant Circuits", N. Demytko et al., Proceedings of the IEEE, vol. 65, No. 3, Mar. 1977, pp. 444–453.

Primary Examiner—Jin F. Ng
Assistant Examiner—R. Vaas
Attorney, Agent, or Firm—Karl F. Ross; Herbert Dubno

[57] ABSTRACT

The method provides the use, for the determination of the estimation echo-channel pulse response, of digital filtering techniques of the transversal adaptive type, and the subdivision of the pulse-response of the equivalent echo channel into three intervals, the second of which consists of the significant portion of the pulse response and is determined by the iterative search for the value and the position of the coefficient of maximum absolute value; the first interval corresponds to a pure delay and the third corresponds to the contribution given by the lowest frequencies of the base band. To copy the echo-signal, there are only considered the pulse-response coefficients whose indexes are comprised in the second interval, and the samples of the signals to be copied belonging to preceding sampling instants, whose indexes are also comprised in the second interval.

2 Claims, 6 Drawing Sheets

FIG. 1

PRIOR ART

METHOD OF AND DEVICE FOR THE DIGITAL CANCELLATION OF THE ECHO GENERATED IN CONNECTIONS WITH TIME-VARYING CHARACTERISTICS

FIELD OF THE INVENTION

The present invention concerns signal transmission over telephone lines comprising 2-wire and 4-wire trunks and in particular it relates to a method of and a device for the digital cancellation of the echo generated in connections with time-varying characteristics.

The terms four-wire and two-wire lines are used here to indicate connections with a monodirectional circuit for each transmission direction or respectively with a single bidirectional circuit for both transmission directions, independently of the transmission means used (cable, radio or satellite links, etc.).

BACKGROUND OF THE INVENTION

It is kown that telephone transmission generally takes place on two-wire lines for short distance connections, while long-distance connections are effected over 4-wire lines.

Between the two kinds of lines the so-called "hybrids" are inserted, i.e. differential transformers with three terminations available, one being connected to the two-wire line and each one of the remaining two being connected to a monodirectional circuit of the 4-wire lines.

Under ideal conditions, the energy present on the 4-wire line ought to be exactly subdivided between the two-wire line and the balancing impendance. However, actually the hybrid coupling is never perfect, and consequently reflections or echoes arise.

More particularly, a part of the signal coming from one of the monodirectional circuits of 4-wire lines is sent back towards the source along the other monodirectional circuit, so that the subscriber, while transmitting, hears again what he has previously transmitted with a delay equal to the time taken by the signal to cover the path to and from the remote hybrid. It has been proved that echo effects are annoying only for delays exceeding a certain value, e.g. 50 ms, and increase with the delay, making the speech practically unintelligible.

In certain cases the echo signal characteristics are non-stationary, that is why after a certain time the estimate effected at the beginning of the iterative procedure is no longer valid.

Non-stationarity causes can depend on the connection among the subscribers, and hence negligeable for the echo cancelling during a given communication, or can take place during a communication. In the two-wire peripheral part of the telephone network translated-band FDM transmission systems (frequency division multiplex) are widely used: this transmission technique gives rise to non-stationarity phenomena during a communication.

According to this type of modulation, one only of the two transmission directions undergoes a further modulation-demodulation process at both ends of the transmission line.

This is effected either to allow, as in the case of 12-channel FDM systems, two-wire bidirectional transmission or, in systems with a higher capacity with transmission onsymmetrical-pair cables, to avoid cross-talk.

Since modulation-demodulation frequencies are locally generated, they can differ from one another, and a voice-band frequency of value $f_o$ before the modulator may be returned by the demodulator with a frequency-shift $\Delta F$.

In such a case a phase-shift exists between modulators-demodulators (the so called phase-roll) which causes a shift of all the frequency components of the echo signal with respect to the main signal.

In addition it should be noted that in the present network multiple-echo cases are possible. When the connection presents a number of 4-wire trunks interspaced by 2-wire trunks, and in same or all the 4-wire trunks translated-band FDM systems are present, overall echo is composed of a plurality of significant reflection components, each affected by a different phase-roll.

A further contribution to the phase-roll can be given by band-inversion line-repeaters of 12-channel systems; in this case in fact a modulation and a demodulation have to be effected, with relevant locally generated frequencies to allow different amplification in the two transmission directions.

CCITT recommends (Rec. G311) a $\Delta F$ between subscribers lower than 2 Hz in both directions.

In such a case the maximum $\Delta f$ for the canceller is 4 Hz.

Echo cancellers known in the art generally consist of:
a transversal digital filter forming the echo channel model;
a circuit for computing the digital filter coefficients;
a circuit for computing the updating rate of the coefficient values;
a double talking detector which inhibits the updating process when the near talker is speaking;
a device called center-clipper for silencing the residual echo.

The echo-estimate has been carried out by copying the pulse-response of the equivalent echo channel, i.e. by computing the convolution between the samples of the digital signal at the input of the far talker side and the transversal filter coefficients; the signal outgoing from the far-talker side, i.e. the residual echo, is obtained by subtracting the echo estimate from the signal at the input of the near-talker side.

The method generally used to compute filter coefficients is the minimization of the residual-echo power, by estimating the power itself either sample by sample or on a sequence of samples. To carry out this minimization an algorithm of the adaptive type is used, by which the coefficients are iteratively computed by adding to the present coefficient value a correction proportional to the correlation between the sample corresponding to the coefficient and the residual-echo sample.

The pulse-response of the echo channel basically consists of a variable pure delay, the so-called flat-delay, due to the variable propagation velocity of the signal in the transmissive medium, and to the delay introduced by the transmission devices; said flat-delay is followed by the significant portion of the pulse response.

Said known cancellers cannot be used for connections which are subjected to phase-roll and which consequently have characteristics which rapidly change in time. In fact said known cancellers do not generally present an updating rate sufficient to cope with channel-characteristic variations due to the phase-roll.

The implementation of an echo-canceller for systems with time-varying characteristics is already known in the art and is described in U.S. Pat. No. 4,072,830, inventors R. D. Gitlin, J. S. Thompson, in the name of Bell Telephone Laboratories.

This implementation provides an SSB modulator in series with the transversal filter for the phase-roll recovery, i.e. the input samples at the far-talker end, before entering the echo-canceller, are modulated with a Weaver modulator, with a modulating frequency estimated starting from the error signal with known adaptive techniques.

Such a structure is usable only if the whole echo channel is affected by the same frequency shift, i.e. by the same phase-roll amount.

On the contrary it is not usable in the case of multiple echo, where a plurality of different phase-rolls are possible.

OBJECTS OF THE INVENTION

It is therefore the object of the invention to produce a method of and device for the echo cancellation for connections of any length affected by phase-roll, which uses a fast-adaptive algorithm and two additional functions: the flat-delay estimate and a suitable band-pass filtering of the input signal.

These two functions allow the use of a short transversal filter, i.e. limited in length only to the significant portion of the pulse-response. The limited number of coefficients to be updated allows the adaptation algorithm convergence to be sped up, so as to make the canceller usable in the described context.

According to the invention there is provided a digital echo cancellation method as described in claim 1.

The invention also extends to apparatus for implementing the said method.

BRIEF DESCRIPTION OF THE DRAWING

Figure 1:
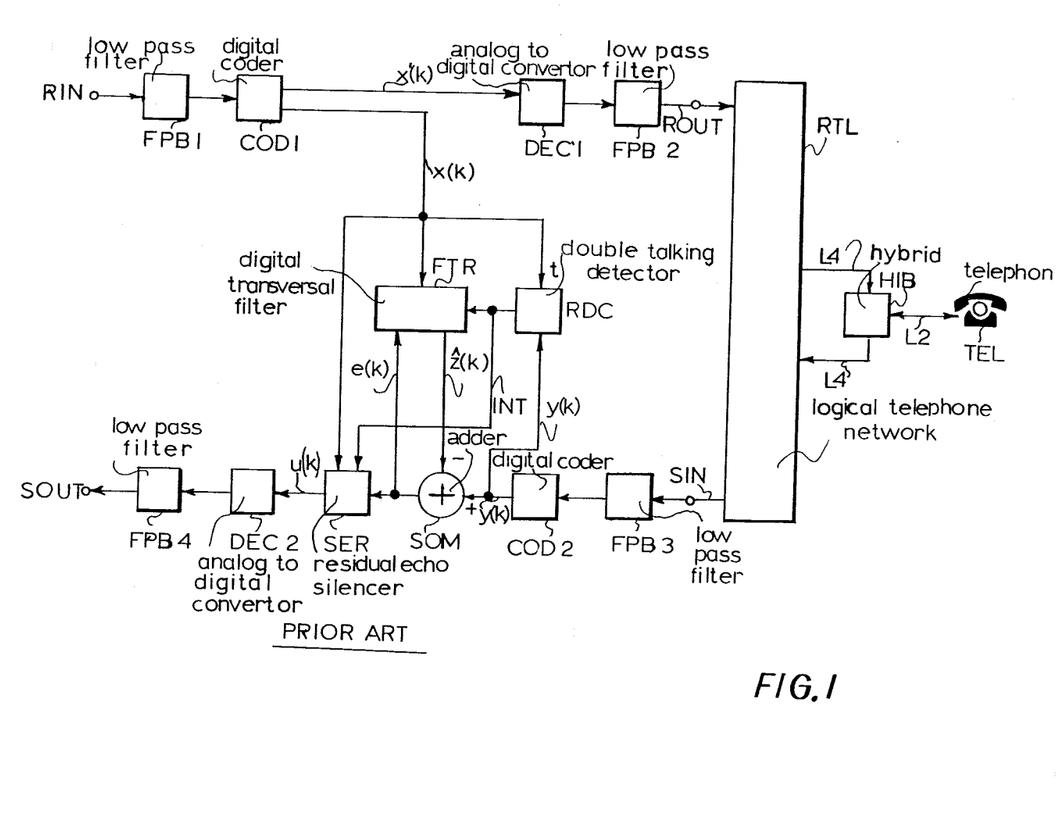
FIG. 1 shows a known echo-canceller structure.

FIG. 4 shows a known structure of echo-canceller inserted at one end of a 4-wire line, which is connected to a local telephone network RTL.

A 4-wire line L4 outgoes from the network RIL and ends at an hybrid HIB, in turn connected to telephone set TEL of the near-talker through a two-wire line L2.

The four terminals of the echo-canceller are: RIN, ROUT i.e. input and output of the signal of the far-talker; SIN, SOUT i.e. input and output of the near-talker.

To the terminals of the canceller there are connected equal low-pass filters FPB1, FPB2, FPB3, and FPB4 to limit the band of the analog signal, which arrives at their inputs, to the only useful telephone band.

The signals outgoing from FPB1, FPB3 are digital converted in coders COD1, COD2 respectively. COD1 and COD2 can consist of PCM coders followed by a dynamics-expander to obtain at the outputs, respectively signals x(k) and y(k) of linear dynamics (in fact usually a PCM coder also compresses the amplitude dynamics of the output digital-signal with a logarithmic conversion curve; said dynamics is to be linearly reexpanded in case a linear-type arithmetic is to be used for the canceller computing device). K denotes the discrete time-variable as an effect of the sampling operation.

The input signals of filters FPB2, FPB4 are obtained by means of the analog-to-digital conversion carried out in blocks DEC1 and DEC2 respectively, with a structure compelmentary to that of coders COD1, COD2. If COD1, COD2 are PCM coders, the input digital signal of DEC1, DEC2 must first be compressed in dynamics according to a logarithmic conversion curve; while DEC2 comprises said compressor at its input, DEC1 does not require it, because to its input signal x'(k) can be directly sent, extracted from COD1 before the dynamics-expander, which generates signal x(k).

At the output of COD1 there are present samples x(k) of the signal RIN of the far-talker which are sent to the blocks FTR, RDC and SER.

At the output of COD2 there are present samples y(k) of signal SIN; y(k) is generally given by the expression $$y(k) = z(k) + n(k),$$

where z(k) is the echo signal to be cancelled and n(k) is low-level residual-noise in case only the far-talker is talking, while it is basically voice of the near-talker in case the latter is speaking too.

Block FTR comprises the digital transversal filter emitting at the output an estimate signal $\hat{z}(k)$ of the echo-signal z(k). Signal $\hat{z}(k)$ is then substracted from the signal y(k) in block SOM to obtain the error-signal e(k) or the residual echo which is also supplied to FTR itself for updating the filter coefficients.

Block SER, inserted upstream decoder DEC2 and downstream adder SOM is a residual-echo silencing device which compares the residual-echo samples e(k) with a threshold value, which depends on the level of signal x(k), and generates a signal U(k) which is equal to zero if e(k) is lower than said threshold, while it is equal to e(k) if the latter exceds the threshold. In presence of speech of the near-talker, SER always sets $U(k) = e(k)$, i.e it interrupts the silencing function not to alter the speech signal.

Block RDC is a double-talking detector to whose inputs the samples of signals x(k), y(k) are sent: RDC emits an output signal on wire INT when it detects the simultaneous presence of voices of the far and near talker. Supposing that hybrid HIB attenuates at least by 6 dB the echo signal which from terminal ROUT passes to terminal SIN, if the difference between signals x(k), y(k) is lower than 6 dB, RDC detects double-talking condition and emits signal INT which interrupts the updating procedure of the transversal filter coefficients occurring in FTR, and also SER operation. In fact the corrections of the coefficient values, being computed also on the basis of the residual echo signal e(k), would be estimated erroneously, as in this case e(k) is basically near-talker voice and not an actual residual echo.

Figure 2:
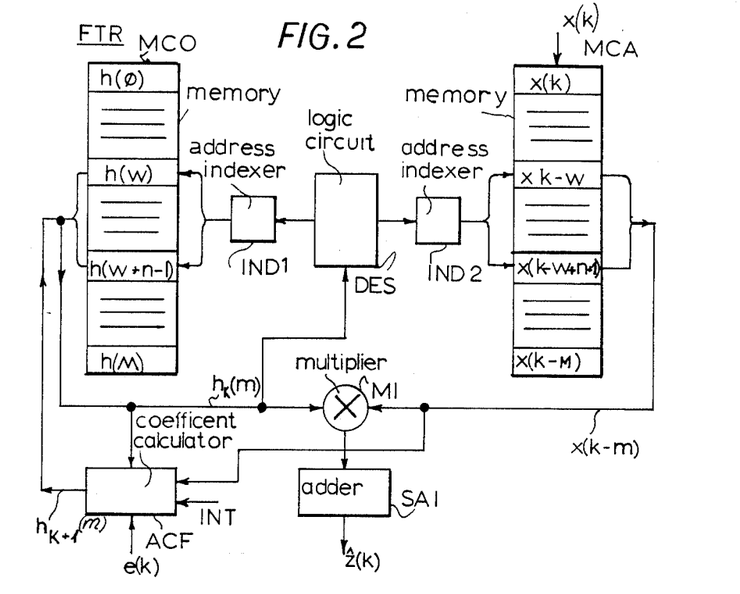
FIG. 2 shows the functional-diagram of block FTR modified according to the invention.
Figure 3:
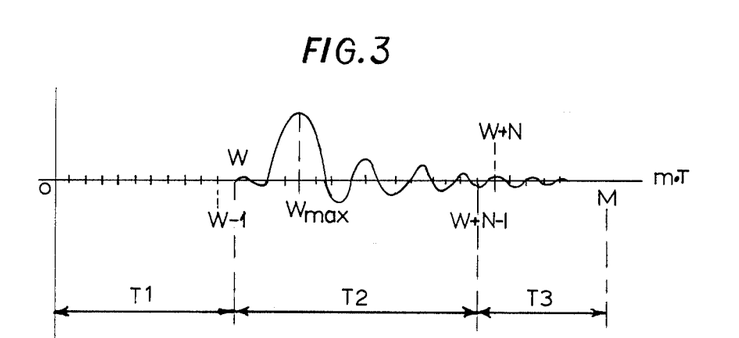
FIG. 3 shows the typical trend in time of the pulse-response of the equivalent echo-channel.

The method provided by the present invention will be now described with reference to FIG. 2, showing the operational scheme of filter FTR of FIG. 1, modified according to the invention, as well as to FIG. 3 showing the typical time trend of the pulse-response of the equivalent echo channel.

To update the transversal-filter coefficient values, an algorithm has been chosen which allows the maximum convergence speed attainable without requiring too high a number of simple arithmetic operations, so as to permit the implementation by VLSI integrated circuits.

The chosen algorithm is of the kind $$h_{k+1}(m) = h_k(m) + \frac{\alpha}{\sigma^2_x} \cdot e(k) \cdot x(k - m) \quad (1)$$

where the index k represents the discrete time-variable index; $m (0 \leq m \leq M-1)$ the m-th tap of the transversal filter having M taps; $h_{k+1}(m)$, $h_K(m)$ the values of the m-th coefficient of the transversal filter at instants $k+1$, k respectively; e(k) the residual echo at instant k; $x(k-m)$ the signal sample at instant $k-m$; $\alpha$ a parameter representing the updating rate; $\sigma^2_x$ the variance of signal x(k).

It is proved that the convergence speed depends on M, and the shorter the transversal filter the higher will be said speed. Besides the convergence speed is maximum, once M is fixed, by setting $\alpha = 1/M$.

Variance $\sigma^2_x$ is obtained by squaring $\sigma_x$ which is the mean square value of signal x(k).

In FIG. 2, block ACF updates the coefficients according to formula (1): on the basis of signal x(k) received at the input, ACF computes $\alpha/\sigma^2_x$ which is multiplied by signal samples e(k) and the result is then again multiplied by the samples of signal x(k) considered at instants $k-m$; the result forms the updating of the m-th coefficient at instant $k+1$ which is then added to value $h_k(m)$ the m-th coefficient had at the preceding sampling instant, in order to obtain value $h_{k+1}(m)$ of the m-th coefficient at the present instant $k+1$.

The computation carried out by ACF is effected at each sampling period T only for significant coefficients (i.e. different from 0) corresponding to the significant portion of the pulse response; in the known echo cancellers on the contrary said computation is effected for all the coefficients.

The operation of the whole block ACF is inhibited in presence of signal INT (FIG. 1).

The updated values $h_{k+1}(m)$ thus obtained are written in MCO usually consisting of a memory, having a number of cells equal to the number of coefficients; the cell number corresponds to that of the coefficient whose updated value replaces the preceding one.

Considering now the estimate signal $\bar{z}(k)$ of the echo signal, this is obtained by the following convolution product:

$$z(k) = \sum_{m=0}^{M-1} x(k - m) \cdot h(m) \quad (2)$$

This formula would be theoretically valid only in case of characteristics unchangeable in time, or depending only on the connection.

In the case the system is affected by phase-roll, the inventors have found that formula (2) is still valid in the hypothesis in which the phase of the echo-affected signal may be taken as constant, for a time equal to M·T, where M is the number of taps of the transversal filter and T is the sampling period; i.e. for a time equal to the overall delay introduced by the transversal-filter delay-line.

The smaller M (i.e. the shorter the filter), the more valid the hypothesis made.

Usually the length of the transversal filter (i.e. the number of taps) depends on the length of the pulse-response to the equivalent echo channel which is to be copied.

FIG. 3 shows that the typical echo-channel pulse-response can be divided into 3 intervals:

the first interval T1 consists, as already said, of the flat-delay which gives rise to a certain number $W-1$ of initial zeroes of the pulse-response which yet equally and uselessly affect the overall filter length and the complexity of the canceller which is equally to carry out arithmetic operations, relevant to said initial values;

the second interval T2 consists of the significant portion of the pulse-response, which supplies the significant value coefficients, with index ranging from W to $W+N-1$, of the estimate signal $\bar{z}(k)$;

the third interval T3, from $W+N$ on, corresponds to the contribution of the lowest frequencies, up to the d.c. value, of the telephone signal base-band; these frequencies being affected by the highest group-delay distortion are usually eliminated in transmission. Hence, also this third interval would uselessly increase transversal-filter length.

According to the method of the present invention the amplitude of interval T1 corresponding to the flat-delay is estimated. Such estimate is obtained by the estimate of the location of interval T2 (considered of fixed length).

So, for the convolution product of formula (2), only the significant part of the pulse-response is used, not taking into account the initial part of pure flat-delay and the final part consisting of the contribution of low frequencies of signal RIN (FIG. 1) which are eliminated by filter FPB1 which is no longer a low-pass filter but a band-pass filter.

Besides also the updating procedure of the coefficients according to the formula (1) is carried out only for the coefficients whose index is comprised in the interval T2 (FIG. 2), taking an updating rate $\alpha = 1/N$.

As a whole a basic reduction is obtained in the total number of arithmetic operations required to compute formulae (1) and (2), and besides a reduction in filter length. In this way the hypothesis made at the beginning on the validity of formula (2) even for systems with characteristics quickly changing in time is enhanced and at the same time the convergence speed of coefficient updating process is increased.

In this way the echo canceller can operate also in the systems affected by phase-roll, where the flat-delay takes up high values.

Then formula (2) will become:

$$z(k) = \sum_{m=W}^{W+N+1} x(k - m) \cdot h(m) \quad (3)$$

where W is the number of samples corresponding to the flat-delay.

In FIG. 2 MCA shows the filter delay-line, usually consisting of a memory where there are written the samples of signal x(k). In accordance with the method of the present invention, only the samples are read of the position of memory MCA corresponding to the sampling instants from $(k-W)$ to $(k-W-N+1)$ with respect to the present instant k in which signal $\bar{z}(k)$ is estimated.

Said samples $x(k-m)$ are then multiplied in multiplier M1 by the values of coefficients $h_k(m)$ read in MCO: the products thus obtained are then added up in adder SA1 in order to obtain at the output, at each sampling interval, signal $\bar{z}(k)$.

Let us consider now the estimate of the amplitude of first interval T1 of FIG. 3, carried out by determining the first useful contribution of formula (3) the one having index m=W.

The last significant contribution having index $m=W+N-1$, and hence the length of the significant part of the pulse-response, is automatically determined, as the actual total number N of taps of the filter delay line is considered fixed.

The procedure, of the iterative type, is the following: there are examined the transversal-filter coefficients whose index is comprised within W and $W+N-1$ and determined at the preceding iteration, beginning with $W=0$ at the first iteration; the coefficient having maximum absolute value is determined, whose index $W_{MAX}$ (see also FIG. 2) is taken as reference value;

from value $W_{MAX}$ an integer fixed number is subtracted thus obtaining value W;

also value $W+N-1$ is determined, as N is fixed and then the location of the second interval of FIG. 2.

This procedure could be carried out at each sampling period, but, in order to reduce computation rate and hence the complexity of the circuit apt to implement it, it is preferred to make each iteration last a number of consecutive sampling periods, by subdividing the search for the maximum value of the coefficients h(m) so that it may occur only on a block of coefficients per each sampling period.

In FIG. 2 block DES is apt to carry out said algorithm and controls the generation of the addresses for memories MCO, MCA which takes place in blocks IND1, IND2 respectively.

At each iteration DES compares a coefficient h(m) with the subsequent h(m+1) storing the one with higher value and the relevant address: this operation is effected for all the coefficients having an index comprised in the interval T2 determined at the preceding iteration: at the end DES will obtain an index $W_{MAX}$ corresponding to the maximum-value coefficient. DES subtracts from this index $W_{MAX}$ a fixed value (experimentally determined), obtaining index W; then it adds to $W-1$ another fixed value N also experimentally determined and corresponding to the effective tap number of the filter, so obtaining index $W+N-1$ which is the other limit of interval T2 (FIG. 3).

Hence DES determines the initial addresses of the positions of memories MCO, MCA which are to be read and written and supplies IND1 and IND2 with these addresses.

At each sampling period IND1 generates the addresses of positions of MCO where the updated values of coefficients from h(W) to $h(W+N-1)$ are to be read and then written; on the contrary IND2 generates the addresses of the positions of MCA where the values of samples from $x(k-W-N+1)$ to $x(k-W)$ are to be read for the computation of formula (2).

Since each iteration effected by DES lasts a few periods T, for all this time the extreme positions addressed in MCO and MCA, determined at the preceding iteration, remain unchanged.

A device will be now described for the implementation of the echo-canceller provided by the invention.

It has already been mentioned that block FPB1 (FIG. 1) consists of an ordinary band-pass filter with a band comprised between 300 Hz and 3400 Hz, while blocks FPB2, FPB3, FPB4 consist of an ordinary low-pass filter with cut-off frequency equal to 3400 Hz.

Blocks denoted in FIG. 1 by COD1, DEC1 and COD2, DEC2 are implemented by an A-law PCM coder-decoder of a known and commercially available type.

All the other functions carried out by the echo-canceller provided by the invention are on the contrary implemented by the microprogrammed unit shown in FIG. 4 which will be hereinafter simple referred to as unit. In particular the unit of FIG. 4 carries out the functions of block FTR of FIG. 2 and blocks RDC, SOM and SER of FIG. 1.

Figure 4:
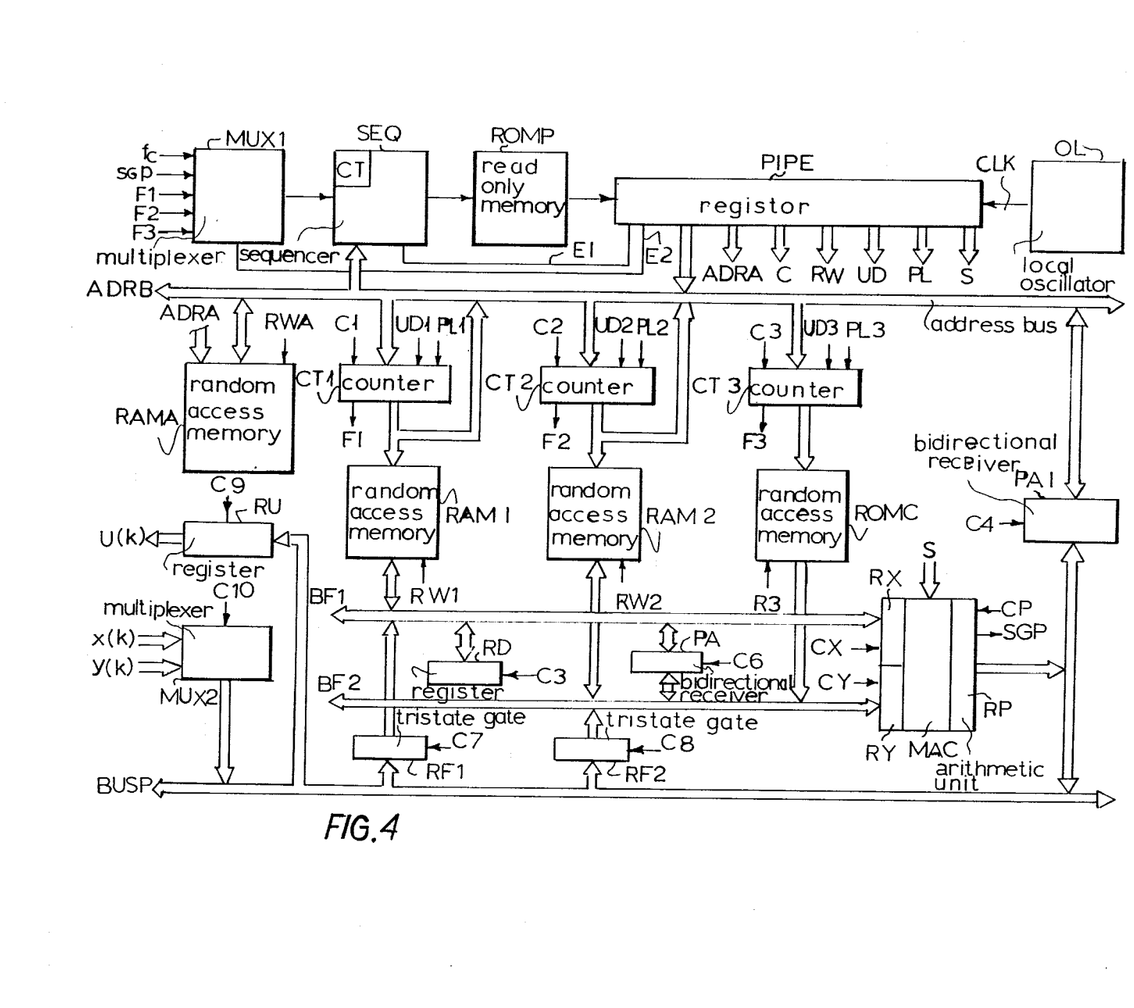
FIG. 4 shows an example of embodiment, given by way of non-limiting example, of a microprogramme unt apt to implement the method provided by the invention.

In FIG. 4, blocks MUX1, SEQ, ROMP, PIPE form the control unit, of known type, of the unit.

ROMP denotes a read-only memory containing the sequence of microinstructions whose flow-chart will be described hereinafter.

PIPE denotes an ordinary register apt to carry out the known "pipeline" function.

At each microcycle time PIPE stores the microinstruction it receives from ROMP and presents it in parallel form at its outputs for a time equal to the microcycle period.

PIPE outputs supply the control signals determining the operations of the various circuits of the unit and the addresses supplied on address-buses ADRA and ADRB.

PIPE supplies output C with control signals C1, C2, C3, C4, C5, C6, C7, C8, C9, C10, CX, CY, CP; at the output RW reading/writing signals RW1, RW2, RWA and the reading signal R3; at the output UD the control signals UD1, UD2, UD3; at the output PL the control signals PL1, PL2, PL3; at the output S control signals for the arithmetic unit MAC.

Signals outgoing from PIPE are synchronized by clock signal CLK coming from the local oscillator OL; the period of signal CLK is equal to a microcycle. The other circuit blocks of the unit do not need said clock signal, as they are automatically synchronized by the relevant control signals coming from PIPE.

SEQ denotes a circuit block acting as a sequencer. It supplies ROMP at each microcycle with the address of the microinstruction, to be carried out and to be stored into PIPE. The address generation is carried out by a counter which under ordinary conditions increments its contents by a unit at each clock period. SEQ can go out from the usual sequence of generated addresses, making a jump to the address supplied to it through bus ADRB, upon a control signal coming from PIPE on connection E1; said jump can be unconditioned or conditioned by the logic level of the signal outgoing from MUX1.

Besides, SEQ comprises a down counter, hereinafter referred to as CT, programmable to the value supplied to it through bus ADRB; this counter serves to execute in repetition a sequence of microinstructions for a number of times equal to the number loaded in it.

Block MUX1 basically comprises a usual multiplexer, which, upon a control signal coming from PIPE on connection E2, supplies at the output towards SEQ one of the signals applied to its inputs which determine the conditioned jumps above. In particular, a signal at sampling frequency fc, extracted from PCM coder COD1 (FIG. 1) is applied. to one of its inputs. This signal allows synchronization of the unit, as it will be explained in relation to FIG. 5. Condition signals at the inputs of MUX1 can in addition be temporarily stored in ordinary memory elements comprised in MUX1, still upon a control signal coming from PIPE on connection E2.

RAMA denotes a usual random-access memory apt to store particular address values present on bus ADRA and to supply them on the same bus upon writing/reading control signal RWA coming from PIPE. RAMA receives the addresses on bus ADRA.

RAM1 and RAM2 denote two usual random-access memories which receive the addresses from blocks CT1 and CT2 respectively and reading/writing signals RW1, RW2 from PIPE; RAM1 and RAM2 store or supply data on buses BF1 and BF2 respectively.

ROMC denotes a usual read-only memory containing determined constant values it supplies on bus BF2 upon a suitable reading control signal R3 coming from PIPE and the addressing supplied by block CT3.

CT1, CT2, CT3 denote usual programmable up-down counters.

They receive the enabling signals from block PIPE on wires C1, C2, C3. Upon specific control signals on wires PL1, PL2, PL3, they can store the address value present on bus ADRB and supply it to the relevant memory.

In addition they can consider said address as starting point of consecutive cells of the relevant memory to be addressed in sequence; in fact they can count upwards or backwards (respectively on the basis of control signals UD1, UD2, UD3), starting from the programmed value, i.e. read on bus ADRB, and supply the value obtained at each counting step to the relevant memory.

In addition the bits of some positions of the computed address can be used as condition signals applied to the inputs of MUX1 through connections F1, F2, F3, respectively.

The addresses present at the outputs of CT1, CT2 are also supplied on the same bus ADRB.

PA1, PA2 denote two usual bidirectional receivers which on the basis of control signals C4, C6 allow the bidirectional exchange of data present on buses ADRB, BUSP and BF1, BF2 respectively.

RD denotes a usual register apt to store the data present at suitable instants on bus BF1, and to re-emit them on the same bus, on the basis of control signals C5.

RF1 and RF2 denote two usual tristate gates apt to supply the data present on BUSP at determined instants on bus BF1 and BF2 respectively, on the basis of control signals C7 and C8.

MAC denotes the computing unit basically consisting of a fast multiplier/accumulator of known type which receives control signals S from PIPE.

In addition MAC comprises two registers RX and RY where data are loaded, which form the two operands, present on buses BF1 and BF2 respectively, when control signals CX, CY are present.

MAC comprises also a register RP, where there is the double-precision result of the carried out operations.

When control signal CP is present, the contents of RP is supplied to the output on bus BUSP. In addition on wire SGP there is present the sign of the result which is supplied as condition signal to multiplexer MUX1.

Bus BUSP is also used for data input/output operations. On the basis of control signal C9, data on BUSP are stored in register RU and supplied at the output and form signal U(k) for block DEC2 of FIG. 1.

Upon command C10, multiplexer MUX2 connects one of the two inputs to bus BUSP, to permit the input of data signals x(k) or y(k) coming from COD1 and COD2 (FIG. 1) respectively.

As it will be also resumed hereinafter, memory RAM2 implements the transversal-filter delay-line (denoted by MCA in FIG. 4) and in the particular non-limiting example described here stores samples x(k) relevant to 128 subsequent sampling instants. On the contrary, memory RAM1 contains coefficients h(m) for a total number M of available positions equal to 128; in addition in RAM1 there are stored values U(k), y(k) and others which will be mentioned hereinafter; N=48 is chosen.

Figure 5:
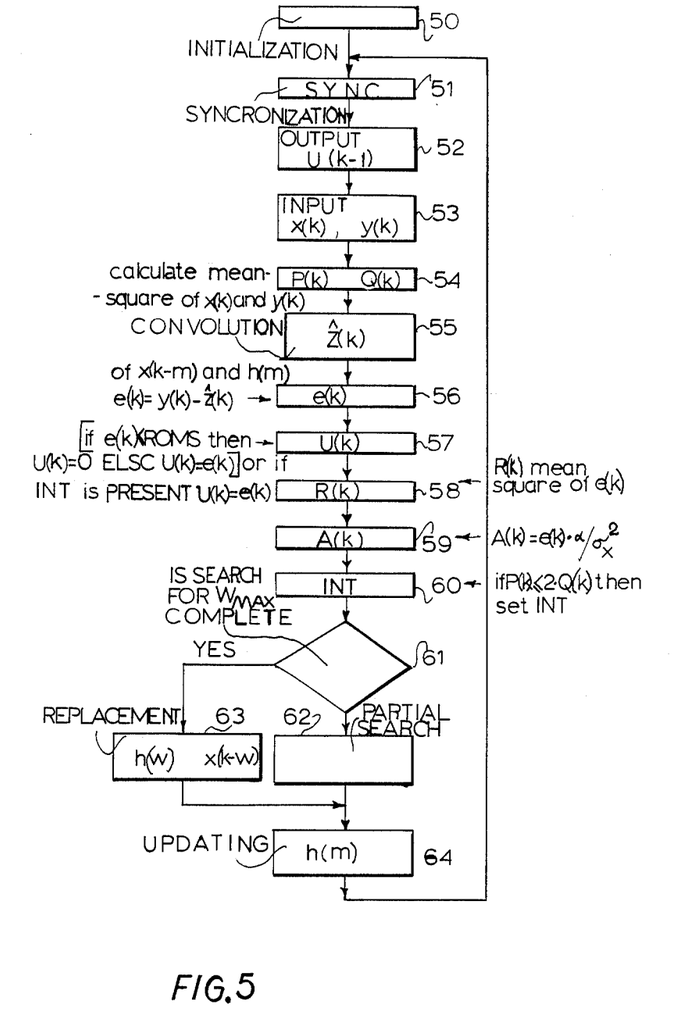
FIGS. 5, 6, 7 are flow charts of the operations carried out by the unit of FIG. 4.
Figure 6:
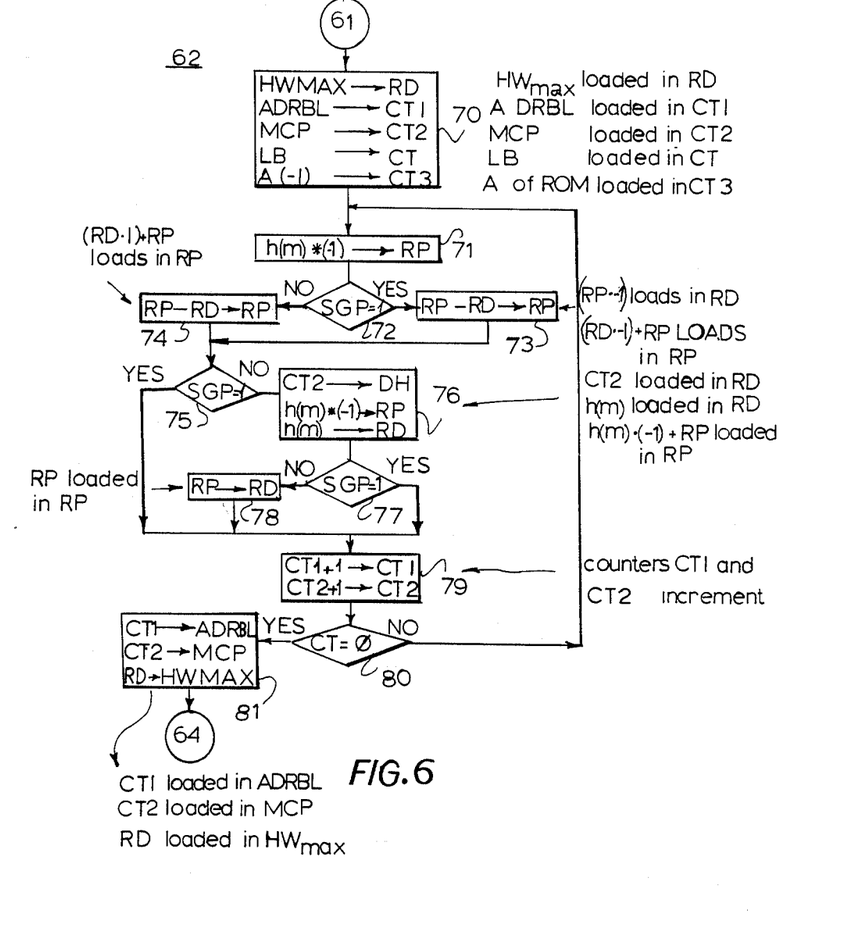
Figure 7:
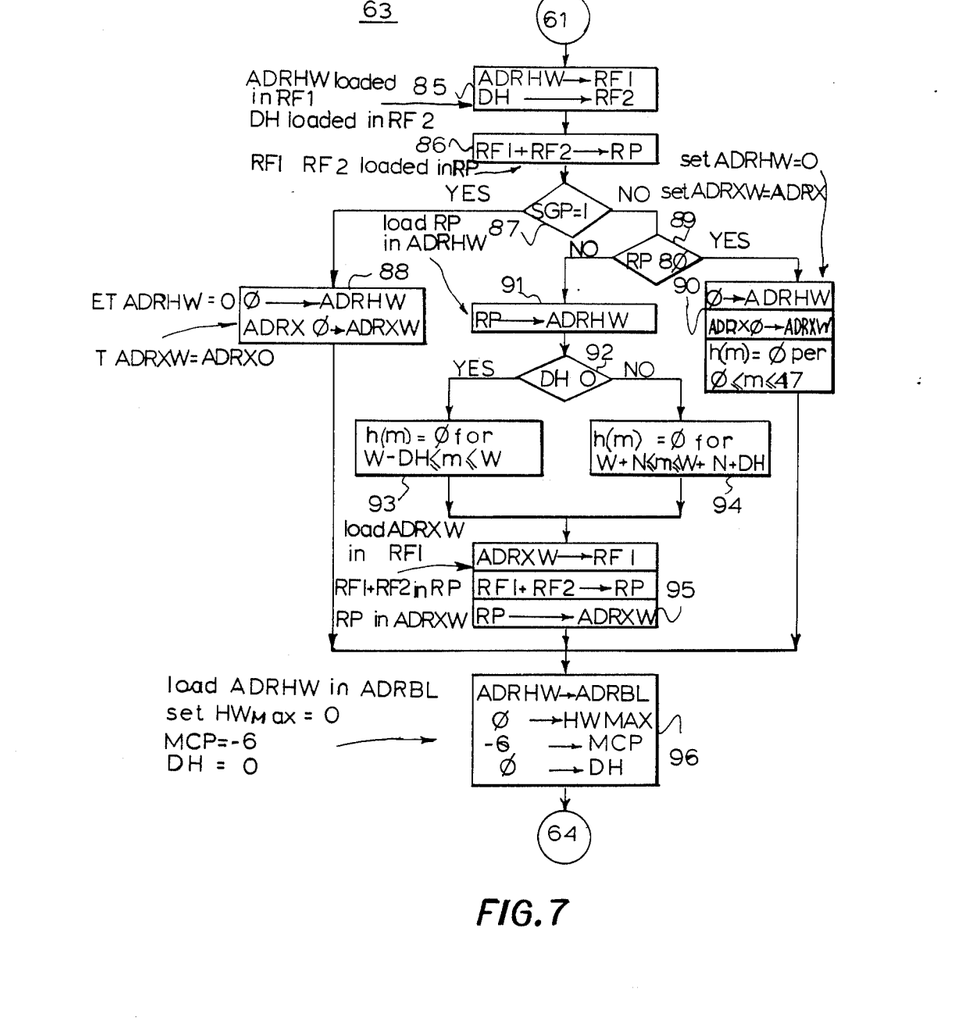

The operation of unit of FIG. 4 will be now described, with reference to flow charts of FIGS. 5, 6, 7. FIG. 5 shows the flow-chart relevant to the sequence of all the operations carried out by the unit.

After the usual initialization operations of phase 50, the unit goes on with the synchronizing operation of phase 51. MUX1 (FIG. 4), upon a control signal coming from PIPE, connects to the output towards SEQ the signal fc at 8 kHz sampling frequency. When a transition occurs of signal fc from level "0" to level "1", SEQ supplies ROMP with the address of the next instruction to be executed, which address has been supplied to SEQ from PIPE through bus ADRB. The transition instant is then that of the beginning of an iteration.

The term iteration will hereinafter denote the sequence of phases from 51 to 64.

Then the unit goes on executing the input/output operations of phases 52, 53: through control signal C9, sample U(k−1), computed and stored in RAM1 at the preceding iteration, is supplied at the output of RU (FIG. 4); then through control signal C10, first x(k) and then y(k) samples are transferred onto bus BUSP and stored in RAM2 and RAM1 respectively through registers RF2 and RF1.

The unit carries out, in phase 54, the computation of the mean-square values of signals x(k) and y(k), thus obtaining two magnitudes P(k) and Q(k) stored in RAM1. The computing procedure of magnitudes P(k) and Q(k) is known per se and it is only necessary to give the following formulae expressing said magnitudes:

$$P(k) = (1-a) \cdot P(k-1) + b \cdot |x(k)|$$

$$Q(k) = (1-c) \cdot Q(k-1) + d \cdot |y(k)|$$

where P(k−1) and Q(k−1) are the values of P and Q obtained at the preceding iteration, and a, b, c, d suitable constant values.

Hence the unit computes in phase 55 the quantity $\tilde{z}(k)$ by effecting the convolution of magnitudes x(k−m) and h(m) according to lue, read in RAMA and computed in phases 62, 63 of the previous iteration, corresponding to the starting address of the successive positions of RAM1 and RAM2 where coefficients h(m) and samples x(k−m) for $W \leq m \leq W+N-1$ are stored respectively; coefficients and samples addressed by counters are then transferred into registers RX and RY respectively; MAC effects multiplication and accumulation operations on the contents of said registers, obtaining at the end in register RP magnitude $\tilde{z}(k)$ which is stored in RAM1. At the beginning of phase 55, counter CT of SEQ is programmed to value N=48, so that the unit may end the above-mentioned MAC operations once CT has reached value "0".

Afterwards the unit computes in phase 56 the residual echo $e(k) = y(k) - \tilde{z}(k)$ re-writing the result in RAM1.

In the subsequent phase 57, the unit carries out the residual-echo silencing operation if the signal INT, possibly generated in phase 60 of the preceding iteration, is absent, MAC compares the value of e(k) computed in phase 56 with a constant threshold value read in ROMC, and, if e(k) is lower than the threshold, it sets $U(k)=0$, otherwise it sets $U(k)=e(k)$; if, on the contrary, INT is present, it always sets $U(k)=e(k)$.

Value U(k) is stored in RAM1 and forms the sample to be sent to the output (thorugh register RU) in phase 52 of the subsequent iteration.

In phase 58 the unit computes the mean square value R(k) of e(k) by using a formula of the kind of those relevant to P(k) and Q(k) and re-writing the result in RAM1.

Then in phase 59 the unit computes $A(k)=e(k)\cdot\alpha/\sigma^2_x$ which will serve for the computation of coefficients h(m); it has already been mentioned that $\sigma_x$ is proportional to P(k), and $\alpha=1/N$. In memory ROMC (FIG. 4) there is stored a table containing the possible values of $\alpha/\sigma^2_x$; this table is addresses by the most significant bits of P(k) read in RAM1 so as to obtain the corresponding value $\alpha/\sigma^2_x$ which is written in RY, while e(k) is read in RAM1 and written in RX. Then MAC computes their product A(k) and writes it in RAM1.

In phase 60 the unit carries out double-talking detection function: MAC compares the values of P(k) and Q(k) present in RAM1 (FIG. 4). If $P(k)\leq 2\cdot Q(k)$, MAC generates signal INT already considered with reference to FIG. 1: signal INT is the sign bit SGP (FIG. 4) of the comparison result which is applied to multiplexer MUX1 and there temporarily stored up to the phase 60 of the subsequent iteration.

Bit SGP is used as a condition signal to carry out the operations of phases 57 and 64.

In phases 61, 62, 63 the unit executes the computations for determining number W. The coefficients are examined whose index m falls within the interval $W\leq m\leq W+N-1$ determined in the preceding iteration, beginning from $W=0$ at the first iteration following the establishment of a connection.

As already mentioned, the test is not carried out all at once, but the interval from W to $W+N-1$, having a fixed length equal to 48 coefficients, is subdivided into 6 blocks of 8 consecutive coefficients each, and at each iteration the search for the maximum partial value is effected on a block of coefficients.

Consequently the total search operation will last six consecutive iterations. This choice is a good compromise between the total search duration and the number of operations carried out at each iteration.

Then in phase 61 the unit checks whether the search has been completed: if it hasn't, it carries out the partial search on a coefficient block; if it has, it replaces the preceding values with the new limits of the just determined interval, both for coefficients h(m) and samples x(k−m), also resetting to zero cells h(m) which have not been considered before.

From what just mentioned, it results apparent that the unit will carry out for six consecutive iterations the procedures of phase 62, while at the 7-th iteration it will cary out those of phase 63.

The procedure of phases 61, 62, 63 will be described in detail with reference to FIGS. 6, 7.

In phase 64, the unit checks whether signal INT is present; i.e. it checks the logic level of bit SGP stored in MUX1.

If INT is not present, the unit carries out the updating procedure of the coefficients with index $W\leq m\leq W+N-1$.

As long as a new search for the position of coefficient of maximum value goes on, the preceding interval is maintained which determines coefficients h(m) to be updated in phase 64 and samples x(k−m) to be taken into account in the computation of z̄(k) of phase 55.

In phase 64 the coefficients are updated by executing the computations provided by formula (1): for each m considered there are read in RAM1 (FIG. 4) the present value A(k), and in RAM2 value x(k−m); these values are multiplied by one another by MAC which sums up to the values thus obtained, the value of coefficient h(m) stored in RAM1.

The addressing of coefficients in RAM1 and of samples in RAM2 is similar to that of phase 55. The result, which is the updated value of coefficient h(m), is re-written in RAM1 in the place of the preceding value.

For reading values h(m) and x(k−m), subsequent positions are addressed in memories RAM1 and RAM2 by using counters CT1, CT2 according to the already described technique.

The end of phase 64 is the end of each iteration, and the unit returns to synchronizing phase 51. For this purpose the total time spent to carry out the operations of phases 51 to 64 is always lower than 125 μs, i.e. than the sampling period.

Then the instant at which the unit returns to phase 51, i.e. the instant at which sequencer SEQ (FIG. 4) is reset to receive signal fc from MUX1, certainly precedes the instant at which the subsequent transition of signal fc from level "0" to level "1" occurs.

FIGS. 6 and 7 show detailed flow charts of the computation procedures carried out by the unit in phases 62 and 63 respectively, which are disclosed in details hereinafter as an example of the way of operation of the unit of FIG. 4.

In the cell of memory RAM1 (FIG. 4) denoted by HWMAX, the value $|h(W_{MAX})|$ is memorized, i.e. the maximum absolute value of the coefficients, which can be either the maximum among the coefficients of the preceding interval from W to $W+N-1$, or the relative maximum determined by the partial analysis of previous coefficient groups.

In memory RAMA the following data are stored:

in the cell denoted by ADRHW the address of the cell of RAM1 where coefficient h(W) determined at the preceding iteration, is stored;

in cell ADRXW the address of the cell of RAM2 where the corresponding sample x(k−W) is stored;

in cell ADRX0 the address of the cell of RAM2 where sample x(0) is stored;

in cell ADRBL the address of the first coefficient of the group which is to be analyzed at the following iteration;

in cell MCP the value of a partial counter of the number of already-examined coefficients preset to value −6, as the first significant coefficients of the second interval is taken to be the coefficient of six positions preceding the maximum coefficient ($W_{MAX}=\bar{W}+6$);

in cell DH the difference between the indices of maximum value coefficients of the preceding and the present iteration: it is a number which may be comprised between −6 and +41.

In memory ROMC, value −1 is also stored in the cell denoted by A.

The unit after checking in phase 61 (FIG. 5) that the search has not been completed, enters phase 62 detailed in FIG. 6.

In phase 70 datum HWMAX is loaded into register RD (FIG. 4); datum ADRBL into counter CT1; datum MCP into CT2, datum LB into counter CT of SEQ; the address of cell A of ROM into CT3.

In phase 71, the value of coefficient h(m) read in RAM1 at the address ADRBL loaded in CT1, is transferred into RX, while the contents of cell A of ROMC, i.e. −1 (cell A being addressed by counter CT3) is transferred into RY; then MAC carries out the product between the contents of registers RX, RY and writes it in RP.

The sign bit of the result is available on wire SGP and is checked by sequencer SEQ in the subsequent phase 72: if it is 1, i.e. is h(m)>0, the unit enters phase 73, otherwise it enters phase 74.

In phases 73 and 74 the unit compares the absolute value $|h(m)|$ with $|h(W_{MAX})|$ present in RD.

In phase 73 MAC multiplies the contents of RP by "−1" to render it positive, following the procedure of phase 71 and re-writes the result in RP; then it multiplies by "−1" the contents of RD and adds it to RP re-writing the result in RP, passing then to phase 75.

In phase 74 MAC carries out the operations of block 73, minus the initial sign inversion of RP, because already positive, and then enters phase 75.

In phase 75 the unit considers the sign of the result of the operations of phase 73 or 74: if SGP=1, then $|h(m)| < |h(W_{MAX})|$ and it enters phase 79; if on the contrary SGP=0, then $|h(m)| \geq |h(W_{MAX})|$ and the unit enters phase 76 in which it considers coefficient h(m) as a new relative maximum.

In phase 76 the contents of CT2 is stored in RAMA in cell DH through bus ADRB. Then, according to the procedure of phase 71, MAC multiplies by −1 the coefficient h(m) and writes the result in RP; $|h(m)|$ is then written in RD in the place of $|h(W_{MAX})|$.

Then in phase 77 the unit carries out the check on the sign of h(m): SGP=1 means that in RD the value h(m) is already positive and the unit enters phase 79; SGP=0 means that the contents of RP is positive and it is then written in RD in phase 78.

At this point in RD there is present the absolute value of the new relative maximum among the examined coefficients.

Then in phase 79, by a control signal on connections UD1, UD2, counters CT1 and CT2 are incremented by a unit.

In the subsequent phase 80, if counter CT of SEQ has not yet attained value 0, meaning that the check on the 8 coefficients of a groups has not yet come to an end, SEQ will address again the first micorinstruction of phase 71 in which there is read in RAM1 a new coefficient h(m+1) addressed by the new contents of CT1, and the whole procedure is repeated up to the next phase 80.

If, on the contrary, CT=0, all the 8 coefficients of a group have been examined and in the subsequent phase 81 the contents of CT1 and CT2 are again stored in cells ADRBL and MCP of RAMA through bus ADRB. In addition the contents of RD is stored in cell HWMAX, of RAM1.

Then the unit enters phase 64 (FIG. 5).

In FIG. 7 there is detailed phase 63 of FIG. 5, where the unit computes the new address values for coefficient h(W) and sample x(k−W), after ascertaining in phase 61 that the search for the position of the maximum is completed.

In phase 85 the unit loads into RF1 (FIG. 4) the contents of the cell ADRHW of RAMA and into RF2 the contents of cell DH of RAMA: these data are transferred from RAMA on bus ADRB, then through register PA1 on bus BUSP and hence into registers RF1 and RF2. Then in RF1 there will be present the address of the old coefficient h(W) and in RF2 the difference in sign and absolute value between preceding and present index $W_{MAX}$.

Thus in phase 86 MAC (FIG. 4) carries out the addition of the contents of RF1 and RF2, respectively transferred in RX and RY, and writes the result in RP in which therefore the value will be present of the new index W which corresponds to the address value of RAM1 where coefficient h(W) is stored.

In phase 87 the sign bit SGP of RP is supplied as a condition signal to sequencer SEQ: if it is 1, the unit enters phase 88, otherwise it enters phase 89.

Condition SGP=1 occurs when the maximum value coefficient has index $W_{MAX}$<6: in this case, to avoid the faulty generation of an index W<0, in phase 88 the unit sets to "0" the contents of cell ADRHW, i.e. it sets W=0.

In addition it correspondingly writes into cell ADRXW or RAMA the contents of cell ADRX0, i.e. it sets x(k−W)=x(k), then it enters phase 96. In this case the first interval of FIG. 3 does not exist i.e. the flat-delay is zero.

In phase 89 the unit checks whether RP contents are greater than 80; in this case, in fact, indices m>M=80+48=128 would be erroneously generated. If RP contents are greater than 80, in phase 90, as well as in phase 88, the unit sets to "0" ADRHW and writes ADRX0 contents into ADRXW, i.e. it is preset to restart the search for the position of the maximum starting from W=0. In addition it resets the values of coefficients h(m) whose index is $0 \leq m \leq 47$, i.e. all the coefficients of the determined new second interval (FIG. 2), to render more correct the updating operation of phase 64 (FIG. 5), thus avoiding taking erroneously into consideration as values h(m) at instant k, values h(m) of the preceding instants.

This reset to zero is carried out by setting at the beginning CT=47 (FIG. 4) and loading in CT1 value 0. Once a reset to zero is over, the contents of CT1 are incremented by a unit, to address the subsequent coefficient, while CT is automatically decremented by a unit: when CT=0, the operation is over and sequencer SEQ jumps to the first address of phase 96.

If in phase 89 RP≤80 is obtained, the unit enters phase 91, in which RP contents are stored in ADRHW cell of RAMA as a new address value for h(W).

Then in phase 92 there is taken into consideration the sign of the contents of RF2 (i.e. of DH): if it is negative (shift of the second interval of FIG. 3 towards lower indices) the unit enters phase 93, otherwise (shift towards higher indices) it enters phase 94.

In phases 93, 94 the unit resets to zero the coefficients which are comprised in the new second interval, and which were not comprised in the preceding one, with a procedure analogous to that followed in phase 90, by loading in CT the absolute value of DH and in CT1 the address stored in ADRHW.

In phase 93, by decrementing at each resetting the contents of CT1, the coefficients with index $W+DH \leq m \leq W$ (DH is <0) are reset; then phase 95 begins.

In phase 94, by incrementing at each resetting the contents of CT1, there are reset to zero the coefficients with index $W+N \leq m \leq W+N+DH$; then phase 95 begins.

In phase 95 the new address of x(k−W) is computed: in RF2 there is still DH, and the content of cell ADRXW of RAMA is loaded into RF1. Then MAC carries out the addition of the contents of RF1 and RF2, previously loaded into RX and RY, and writes the result into RP; then it writes the RP contents into ADRXW and enters phase 96.

In phase 96 the unit presets ADRBL, HWMAX, MCP, DH for a new group-by-group coefficient search which will begin in phase 62 (FIG. 5) of the subsequent interation. Then the unit stores in ADRBL the new contents of ADRHW, resets to zero HWMAX and DH, and sets MCP to "−6".

Then the unit enters phase 64 (FIG. 5).

Modifications and variations are possible without going out of the scope of the invention.

What is claimed is:

1. An adaptive digital echo canceler for an echo-channel pulse response, said pulse response comprises a first interval, a second interval and a third interval, and wherein:

the first interval consists of flat-delay;

the second interval has a time period less than voice time periods;

the third interval has a time period greater than voice time periods, and said canceler comprises:

a processor unit comprising a control unit (MUX1, SEQ, ROMP, PIPE), a computing unit (MAC), first, second, and third random access data memories (RAM1, RAM2, RAMA), a read only memory (ROMC) containing determined constant values, said memories being addressed by first, second, and third programmable up/down counters (CT1, CT2, CT3) connected to an address bus (ADRB), data input/output devices (RU, MUX2) connected to an internal bus (BUSP), said first data memory (RAM1) storing coefficients h(m) where m(0<m<M) is the index of an m-th filter tap of a transversal filter, said coefficients h(m) being present on said internal bus (BUSP), said first data memory (RAM1) supplying the coefficients h(m) onto a first input bus (BF1) of said computing unit (MAC), said second data memory (RAM2) implements a delay line of said transversal filter storing the last M samples x(k), present on said input bus (BF2) of said computing unit (MAC), k being a time variable in discrete form, said third data memory (RAMA) storing bit configurations present on said address bus (ADRB), the output of said computing unit being connected to said internal bus (BUSP) which can be connected to said address bus by a bidirectional receiver (PA1), for determining said second interval, said first memory stores said coefficients h(m), said indexes of said coefficients h(m) and a maximum absolute value of said coefficients being iteratively calculated, said maximum value being stored in a first register (RD) connected to said first internal bus (BF1), and said computing unit (MAC) computing for each of said coefficients a first difference between an absolute value of each of said coefficients and said maximum value, wherein if said first difference is positive, said computing unit writes in said first memory (RAM1), through a second register (PF1), which connects said internal bus with said first internal bus (BF1), the absolute value of each of said coefficients in the position of said maximum absolute value, and in said third data memory a second difference between the addresses of the first of said coefficients of said second interval and of one of said coefficients, said second difference being a counting value attained by said second programmable counter (CT2) being incremented, each of said coefficients being examined and a third difference being derived between the address of the first of said coefficients and the address of a maximum value of said coefficients of said second interval, and when all the coefficients of said second interval have been examined, said computing unit adds in a first addition the address of said first of said coefficients and the value of said second difference forming a first result, being written in said third memory (RAMA) and transferred onto said first internal bus (BF1) and a second internal bus (BF2) through a second register (RF1) and a third register (RF2) connected to said internal bus (BUSP) and said first result being written into said third memory (RAMA) as an address of said first of said coefficients of a new second interval, said computing unit then carrying out a second addition between the address of sample X(k−W), the beginning of said second interval having an index W corresponding to a coefficient h(W) stored in said third data memory (RAMA) and transferred through said third register (RF2) on said second internal bus (BF2) and said second difference, forming a second result, and writing said second result in said third memory (RAMA), in an address of the first result, as a new address of sample x(k−W), and if the first result is negative, or greater than W−N, N being the effective tap number of said transversal filter, an address for coefficients h(0) is written in said third memory as an address of the first of said coefficients of the new second interval, and an address of sample x(k) being a new address of sample x(k−W).

2. A canceler as defined in claim 1 wherein, after said computing unit adds the address of said first of said coefficients and the value of said second difference forming a first result, addresses of said first memory (RAM1) corresponding to indexes of said coefficients in said new second interval, are reset.

* * * * *